United States Patent [19]
Gallay

[11] 3,777,898
[45] Dec. 11, 1973

[54] TRACTION AND STEERING DEVICE

[76] Inventor: Maurice Gallay, 151 Blvd. de Chinon, Joue Les Tours, France

[22] Filed: Oct. 8, 1971

[21] Appl. No.: 186,386

[30] Foreign Application Priority Data
Oct. 5, 1970 Great Britain.................. 35,916/70

[52] U.S. Cl.................... 212/38, 212/46 R, 212/49, 212/69, 212/145
[51] Int. Cl........................................... B66c 23/36
[58] Field of Search..................... 212/38, 69, 46 R, 212/49, 145

[56] References Cited
UNITED STATES PATENTS
3,357,573   12/1967   Stukins ................................ 212/49
3,603,614   9/1971   Gauchet........................... 212/145 X

*Primary Examiner*—Evon C. Blunk
*Assistant Examiner*—H. S. Lane
*Attorney*—Irving M. Weiner

[57] ABSTRACT

A traction and steering device comprising of a chassis, a rotatable platform pivotably mounted on the chassis, a front axle and a drive and steering unit connected to the rotatable platform, a rear axle connected to the chassis and lowerable stabilizing arms which are connected to the chassis and operate to lift the device above the ground. The front axle is used to drive and steer the vehicle whereas the rear axle is used merely as a load bearing axle.

5 Claims, 5 Drawing Figures

TRACTION AND STEERING DEVICE

The present invention concerns a traction and steering device of a new type, more particularly for building sites and public works. This device can support a foldable and guidable crane, and is capable of being transported on road by its own means.

Devices of this kind proposed heretofore generally have the arrangement shown in FIG. 1. They comprise a bearing chassis 1 resting on axles 2 and 3. This chassis is surmounted by a guidable table 4 permitting pivoting of a platform 5 about a vertical axis 6. The platform 5 is provided at the front with a control and driving unit 7 and, if desired, a counterweight 8; at the rear it is provided with a trestle 9, to the axis 10 of which there is pivotably connected the lowerable mast 11 of a crane. A jib 13 is connected to the top 12 of the mast.

Such a known system has numerous disadvantages, in particular;

a. the driving or transmission chain 14 which connects the drive unit 7 to the drive axle 2 must necessarily pass through the vertical axis 6 of the guide table 4, thus considerably complicating the construction and increasing its cost price;

b. when this vehicle is travelling on the road (FIG. 1) the large mass of the drive unit 7 and of the counterweight 8 represents, relative to the chassis, a heavy weight, the swinging of which must be compensated only at the level of the guide table 4, which is all the more difficult because of the disposition of the masses 7 and 8 is considerably in front of the axis 6;

c. the steering transmission is located between the control unit 7 and the guide wheels of the vehicle (which may be those of the front axle 2 or the rear axle 3), and is expensive and complicated and must also pass through the vertical axis 6;

d. to bring the device to the working position, it is necessary to raise the wheels of axles 2 and 3 above the ground, which is effected by an initial set of lifting jacks, while a second set of lifting jacks is necessary to ensure adjustment, that is to say, the bringing of the platform 5 to the horizontal.

The object of the present invention is to minimize these disadvantages by producing a traction and steering device having a particularly simple, lightweight and inexpensive construction.

The traction and steering device of the present invention comprises a front axle and a rear axle, a drive unit, a chassis and a rotatable platform pivoting on the chassis, and it is characterized in that the front axle and the drive unit are connected to the rotatable platform, while the rear axle is connected to the chassis, means being provided to lock the rotatable table in a given position or, alternatively, to control the pivoting of the platform on the chassis.

According to another feature of the invention the chassis is fitted with lowerable stabilizing arms, each provided with a double acting lifting jack, said jacks being controlled independently of each other thus making it possible, with a single set of jacks, to apply the stabilizers to the ground, to raise the platform above the ground on the forward and rearward stabilizing arms and finally to complete the adjustment of the platform to the horizontal.

The accompanying drawings, given by way of example only, will enable the features of the present invention to be more easily understood; in these:

FIG. 1, already referred to shows a known kind of lifting and steering device;

In the drawings like parts are indicated by like reference numerals.

Figure 1:
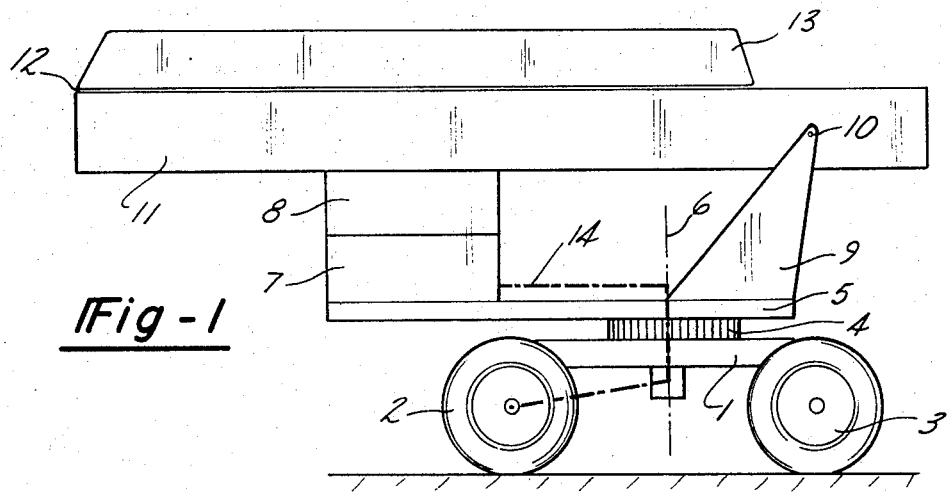

The drawings FIGS. 2 to 5 show a self-propelling foldable crane comprising:

A front axle 22;

A rear axle 23,

A chassis 21 supported merely by the rear axle 23;

A guide table 24 mounted on the chassis 21;

A rotatable platform 25 capable of pivoting relative to the chassis 21, about the vertical axis or pivot point 26 of the guide table 24;

A drive and a steering unit or control cab 7;

A trestle 29 supported by the rear of the platform 25;

A crane formed by a mast 21, a jib 40 and a counter-jib 30.

According to the principle feature of the invention, the drive and steering unit 7 is connected to the front of the platform 25, as is the front axle 22.

It will therefore be seen that if the wheels of the front axle 22 are both driving and steering, there is no need at all to pass the drive chain through the axis 26 of the table 24 to connect the drive wheels of axle 22 to the driving and steering unit 7. The assembly 7, 22 forms an independent driving and steering unit. This arrangement results in the rear axle becoming simply a load bearing number.

According to a further feature of the present invention, the chassis 21 is provided with four stabilizing arms 31 which are pivotable about the axis 32, and operable by the action of a double acting jack 33. Each arm 31 has a leg 34 to support it on the ground.

Figure 3:
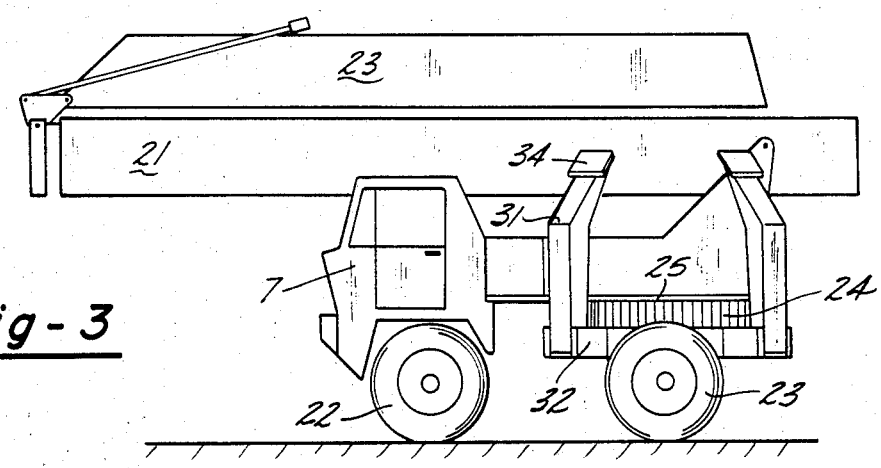
FIG. 3 shows the device of FIG. 2 folded into the position for transport on the road.
Figure 4:
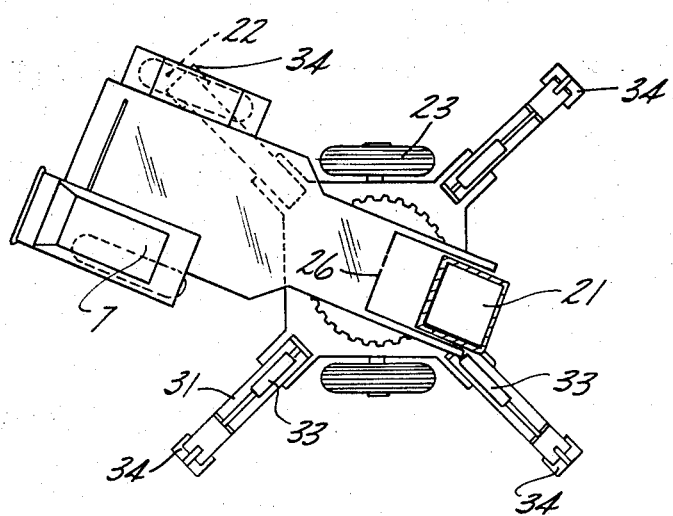
FIG. 4 is a plan on the line IV — IV of FIG. 2 for an intermediate position of the table.

Hence, when the crane is in the working position, the four stabilizers 31 are extended diagonally, as shown in FIG. 4. Due to this arrangement the device is reliably provided with a supporting polygon of large surface, defined by the four legs 34, but when the arms 31 are raised (FIG. 3) they become vertically located around the folded crane 21, 40 and do not exceed the obstruction limits fixed by the highway code.

Figure 2:
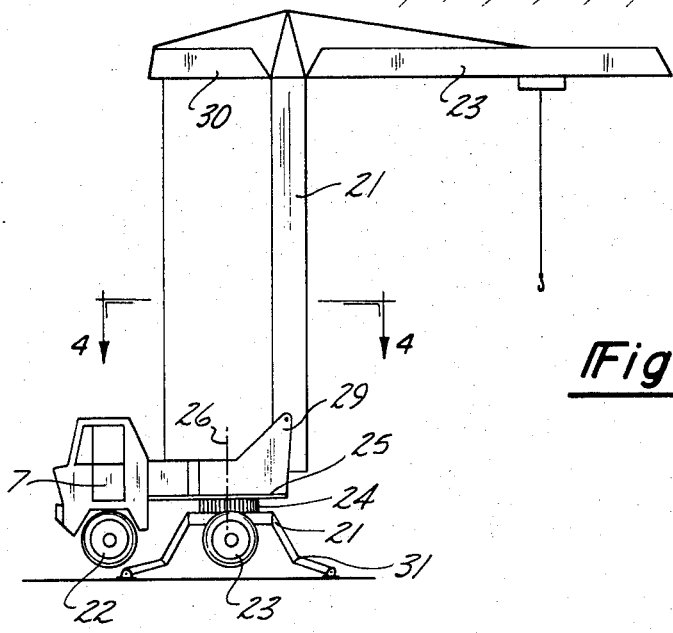
FIG. 2 is a schematic view showing a lifting and steering device according to the invention, in a working position.
Figure 5:
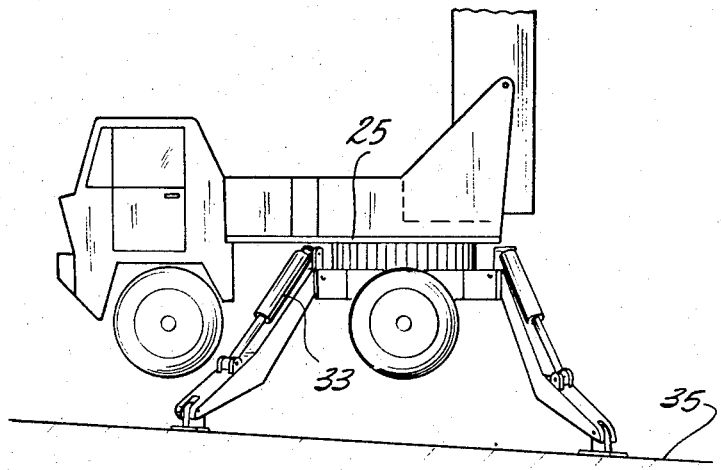
FIG. 5 shows the use of the jacks for the horizontal adjustment of the platform.

A further feature of the present invention resides in providing an independent control for each of the four jacks 33. Due to this arrangement, the jacks are able:

On the one hand, to be in contact with the ground and to raise the assembly of the device as shown in FIG. 2, the wheels of axles 22 and 23 all being out of contact with the ground; and, on the other hand, to complete the adjustment of the device, that is to say, to adjust the exact horizontal position of the platform 25, even if the ground 35 is uneven or sloping, (as shown in FIG. 5).

Finally, means of any known type, not shown, are provided between the platform 25 and the chassis 21 to lock them relative to each other in one or more selected angular positions. For example, in the transport position, the axis 26 of the table 24 is locked, to immobilize the front axle 22 and rear axle 23. The axles 22 and 23 are disposed in parallel with each other (FIG. 3).

Operation is as follows:

When the vehicle is in the transport position (FIG. 3) it is presented in the manner of an ordinary front traction device the wheels of axle 22 of which are actuated directly from the drive unit 7 and the control cab. It will be noted that, with this arrangement, the table 24 has no stress to withstand, due to oscillations originating from the heaviness of a counterweight carried by the platform 25. This mades it possible to lighten the weight of the construction.

In the working position, the stabilizing arms 31 are lowered as shown in FIGS. 4 and 5, then the table 24 is unlocked. Since the assembly of wheels of axles 22 and 23 is raised above the ground, the platform 25 is able to turn about the axis 26 and it will be noted that the front axle 22, as well as the control cab and the drive unit 7 represent the counterweight for balancing the crane 21, 40. This arrangement is extremely advantageous for, by using the weight of the elements 7 and 22, which weight was of no use on conventional devices, it is unnecessary to load the device with an extra counterweight. This makes it possible to simplify the construction even more and to reduce the weight of the assembly, for the same performances of the crane 21, 40.

In a variation, the rear axle 23 may also be driven (FIG. 3) by connecting it to the engine of the vehicle by any known transmission, for example, hydraulic, mechanical or electrical. A transmission shaft may simply be mounted between the bridges of the two axles, front 22 and rear 23.

I claim:

1. A traction and steering device comprising a chassis, a rotatable platform pivotally mounted on the chassis and having a drive unit and front and rear axles, characterized in that the drive unit and front axle are mounted on the rotatable platform, the rear axle is mounted on the chassis and control means is provided for locking the rotatable platform with the front and rear axles in parallel relationship and for controlling the rotation of the platform with respect to the chassis.

2. A traction and steering device as claimed in claim 1 in which lowerable stabilizing arms are mounted on the chassis, a double-acting lifting jack is provided on each of said stabilizing arms and operating means is provided for the independent control of each of said lifting jacks whereby a single set of lifting jacks is operative to apply the stabilizing arms to the ground, simultaneously to lift the front and rear axles from the ground and horizontally to adjust the platform.

3. A traction and steering device as claimed in claim 2 in which driving and steering means are provided for simultaneously driving and steering the front axle, the rear axle being simply a load bearing member.

4. A traction and steering device as claimed in claim 2 in which driving and steering means are provided for simultaneously driving and steering the front axle, further driving means being provided for driving the rear axle.

5. A traction and steering device as claimed in claim 2 in which the driving unit and the front axle are mounted with driving and steering means for simultaneously driving and steering the front axle at a front side of the rotatable platform and frame means for supporting a foldable crane mast is mounted at a rear side of the rotatable platform, and a pivot point is mounted on the chassis and connected to the rotatable platform at a point located between the frame means and the driving and steering means whereby the drive unit and front axle constitute counterweights for the crane relative to the pivot point.

* * * * *